(12) United States Patent
Farrokhi et al.

(10) Patent No.: US 10,254,408 B2
(45) Date of Patent: Apr. 9, 2019

(54) TDOA-BASED POSITIONING SYSTEM USING TERRESTRIAL WIRELESS SIGNAL SOURCES

(71) Applicant: ETHERWHERE CORPORATION, Sunnyvale, CA (US)

(72) Inventors: Farrokh Farrokhi, San Ramon, CA (US); Dickson T. Wong, Burlingame, CA (US)

(73) Assignee: ETHERWHERE CORPORATION, Sunnyvale, CA (US)

( * ) Notice: Subject to any disclaimer, the term of this patent is extended or adjusted under 35 U.S.C. 154(b) by 0 days.

(21) Appl. No.: 14/998,500

(22) Filed: Jan. 12, 2016

(65) Prior Publication Data
US 2018/0003827 A1   Jan. 4, 2018

Related U.S. Application Data

(60) Provisional application No. 62/102,587, filed on Jan. 12, 2015.

(51) Int. Cl.
*G01S 5/10* (2006.01)
*G01S 19/07* (2010.01)
*G01S 19/21* (2010.01)

(52) U.S. Cl.
CPC ............... *G01S 19/07* (2013.01); *G01S 5/10* (2013.01); *G01S 19/21* (2013.01)

(58) Field of Classification Search
CPC .......... G01S 19/11; G01S 19/46; G01S 19/42; G01S 5/10; G01S 19/45; G01S 19/13; G01S 1/08; G01S 5/0036; G01S 5/0236; G01S 5/14; G01S 5/145; G01S 5/0242; G01S 11/08; H04W 64/00; H04W 64/003
See application file for complete search history.

(56) References Cited

U.S. PATENT DOCUMENTS

2012/0133554 A1* 5/2012 Bromley ............... G01S 5/0018
                                                                 342/357.25
2013/0106657 A1* 5/2013 Perthold ................. G01S 5/021
                                                                 342/387

\* cited by examiner

*Primary Examiner* — Kwasi Karikari
(74) *Attorney, Agent, or Firm* — Haynes and Boone, LLP

(57) ABSTRACT

A positioning system is provided in which a client device samples a transmission from any suitable terrestrial wireless source. The resulting samples are correlated with replica samples to determine a position of the client device using time-difference-of-arrival-based calculations.

9 Claims, 23 Drawing Sheets

TDOA-BASED POSITIONING SYSTEM USING TERRESTRIAL WIRELESS SIGNAL SOURCES

CROSS-REFERENCE TO RELATED APPLICATIONS

This application claims the benefit of U.S. Provisional Application No. 62/102,587, filed Jan. 12, 2015.

BACKGROUND OF THE INVENTION

This invention relates to techniques for determining location and more specifically to techniques that utilize wireless communication devices such as cellular base stations and WiFi access points.

The NAVSTAR Global Positioning System (GPS) developed by the United States Department of Defense uses a constellation of between 24 and 32 Medium Earth Orbit satellites that transmit precise microwave signals, which allows devices embodying GPS sensors to determine their current location. Initial applications were predominantly military; the first widespread consumer application was navigational assistance.

With the explosive growth in mobile communications devices, a new wave of location-based applications is emerging. These applications are characterized by a requirement for device-centered maps. One example is a form of "Yellow Pages" in which a map centered at the location of the mobile device presents user-selected establishments (e.g., barber shops) in situ. Another example would be an application enabling one to locate, on a device-centered map, members of his or her social network.

In a strong signal environment (such as outdoors), GPS is a reliable and accurate source of the location information essential to enable a device-centered map to be served across a network to a mobile device. The location of the client device is determined by using the time-difference of arrival (TDOA) of signals transmitted from a GPS satellite to a client device. The location of the client device is determined by using TDOA information between the client device and at least four GPS satellites, as there are four unknowns that need to be determined (X, Y, Z coordinates and the local time of the client device). For a 2 dimensional location, TDOA information from three GPS satellites are used as the Z coordinate is assumed to be on the surface of the Earth.

In contrast to the relatively-robust strong-signal operation, satellite-based positioning systems such as GPS work poorly if at all in weak-signal environments such as indoors. The received satellite signal is relatively weak and thus greatly attenuated by structures. Conventional GPS receivers, even when operating in 2D mode (using just three satellites and, most commonly, a pseudo satellite located at the center of the earth) do not have sufficient sensitivity to provide reliable and accurate location information in weak-signal environments. FIG. 1 describes the well-known difficulty in obtaining a GPS fix at indoor locations. The path losses caused by walls, windows, roofs, floors, and other structural components weaken the already relatively-weak unobstructed received signal strength such that the receiver cannot acquire sufficient satellite signals for a position fix. The path losses and other factors such as multipath ambiguity prevent the determination of TDOA information.

As a result, various non-satellite-based positioning systems have been developed to aid in position determination in weak-signal environments. For example, the received power from a local cellular base station for a mobile device is generally considerably greater than the power of a received satellite signal as the base station may be just hundreds of yards away whereas the GPS satellites are orbiting thousands of miles away in space. Cellular-based positioning systems such as shown in FIG. 2 thus offer an improvement over satellite-based systems for indoor positioning applications. Since the precise location coordinates of individual cellsites in a cellular system are known, the estimated location of client devices equipped with a cellular radio can be determined, especially since signals from cellsites were designed to provide reliable coverage in indoor and urban canyon environments. A cellular phone scans the cellular frequency band for available cellsites. The received signal strength of each cellsite is determined. This is commonly referred to as RSSI (received signal strength indication). The RSSI signal is used primarily to determine the best cellsite to be used by the cellular phone to provide the communication link between the cellular phone and the cellular system. Prior art location technology utilizes the RSSI information between a client device and cellsites to approximate the location of the client device. Similarly, there are prior art examples which provide location information of a client device which use RSSI signatures from other wireless communication devices such as WiFi access points (APs). However, determining the physical distance between a transmitter and a receiver via an RSSI signal is not precise because it varies widely with the particular RF environment.

There is need in the art to provide the location of a client device which has improved accuracy over RSSI based systems even in indoor and urban canyon environments.

DETAILED DESCRIPTION

Figure 1:
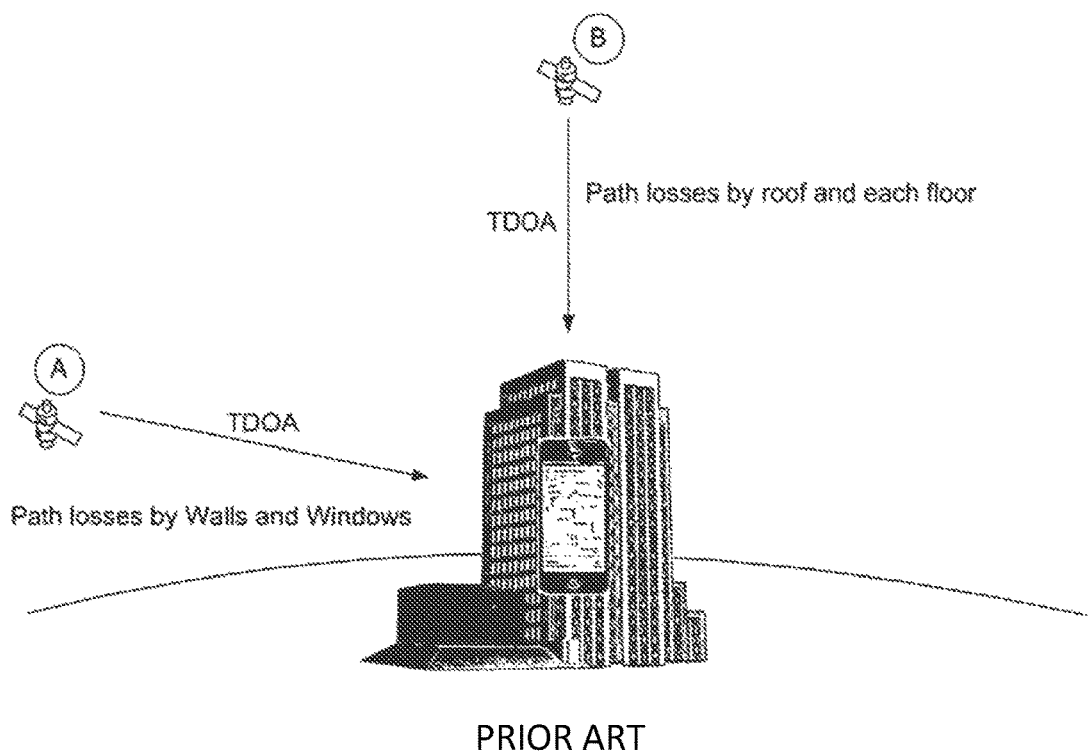
FIG. 1 illustrates a client device in a conventional weak-signal environment for a satellite-based positioning system.
Figure 2:
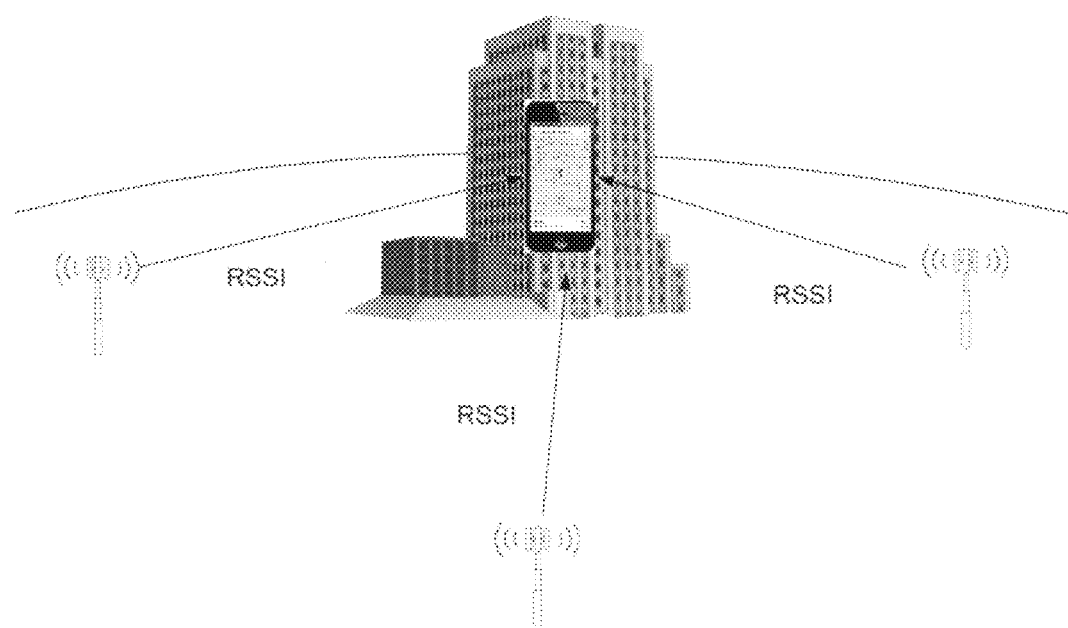
FIG. 2 illustrates a client device in a conventional cellular RSSI-based positioning system.

Positioning systems and methods are provided that exploit the greater power and availability of wireless network signals such as cellular signals, WiFi signals, and Bluetooth signals yet possess the greater accuracy of a time-difference-of-arrival (TDOA) approach such as used in satellite-based positioning systems such as GPS. The signal sources may be entirely agnostic to the techniques and systems disclosed herein. This is quite advantageous as no re-engineering of cellular base stations or WiFi hotspots is necessary. Moreover, the technique is agnostic as to the wireless source type. For example, the RF spectrum may be scanned to locate whatever is available: a WiFi hotspot source may thus be combined with a cellular base station source, or with a Bluetooth source, and so on. Indeed, one or more of the wireless sources may comprise a satellite source such as a GPS antenna. In such a case, the replica signal for the correlation to determine the pseudorange between the client device and the signal source is simply the PRN sequence for the particular GPS satellite. But with other types of wireless sources such as a base station or a WiFi hotspot, the wireless source does not simply repeat a PRN sequence but instead is transmitting data. The signal from such a wireless source will thus vary continuously.

There are a number of ways to provide the signal replica for such varying sources. The signal replica may be provided directly from a source (or sources), as an active participant of determining the TDOA between the source and the client device. However, the present invention does not require the active participation of the source. For example, one or more receivers are used herein that are denoted as "sniffers." Each sniffer device is a receiver that samples a received signal from the wireless source during the same time period that the client device samples a received signal from the same wireless source. In contrast to the client device, each sniffer has an accurate clock so that it may accurately timestamp the received samples from the wireless source. The resulting time-stamped samples are denoted herein as a "datagram."

An example of a sniffer device is a GPS-enabled mobile device such as a cellphone. Such devices are already configured to sample a wireless signal such as from a WiFi source or from a cellular base station. The sniffer device may then upload the resulting datagram to the "cloud" (e.g., the Internet) to one or more servers. Similarly, the client device uploads its datagram to the cloud as well. The following discussion will refer simply to the "cloud" to refer to the server or servers that are configured to practice the advantageous positioning disclosed herein. The cloud also may use the x,y,z location of the wireless source and the sniffer in order to time-stamp the transmitted signal from the wireless source. Since the range between the wireless source and the sniffer is known, the time of transmission for the wireless source for the datagram received by the sniffer is determined by multiplying the range by the speed of light to get the propagation delay and then subtracting the propagation delay from the time of receipt at the sniffer.

With regard to a wireless source such as a WiFi hotspot, the transmitted signal changes depending upon its data content. However, it is not necessary to decode the data (if any) that is encoded in the transmitted signal, since the transmitted data from the wireless source is sampled (replica signal) and is used only to cross correlate with the signal received by the client in order to determine the ranging information between the client and the wireless source. The cloud thus correlates the client datagram and the sniffer datagram in an analogous fashion as a GPS receiver correlates its received satellite signal samples with its stored PRN replica. The data content of the wireless source is thus akin to the "data" in a GPS PRN sequence. The ones and zeros in a datagram may thus be denoted as chips since the "data" is actually the correlation peak determined by the cloud (as will be explained further herein, note that the correlation may also be performed by the client device in alternative embodiments).

A wireless provider will have many customers whose devices may all be configured to act as a sniffer: The cloud will thus be updated continually with sniffer datagrams of available wireless sources. A client device need merely sample sufficient sources such that the cloud may determine its position. In that regard, each correlation between a sniffer datagram and the corresponding client datagram results in a pseudorange, which is "pseudo" due to the unknown offset between the client device's clock and the accurate clock in the sniffer. As is well known in the GPS arts, four pseudoranges may be used to determine the x,y,z position of a GPS receiver as well as its clock offset. Similarly, four pseudoranges for a client device as disclosed herein may be used to determine its x,y,z position and its clock offset. Alternatively, if the z coordinate has an assumed value, just three pseudoranges are necessary. But note the power of the resulting technique: the client device may be indoors or in other weak-signal environments (weak with respect to GPS) but still receive 3 to 4 wireless signals from corresponding wireless sources such as cellular base stations or WiFi hotspots. Note that a cellular base station may have its signals contained in a certain band such as around 700 MHz. In contrast, a WiFi hotspot may be at 2.4 GHz, 4 GHz, and so on. Given a suitably high enough sampling rate, the client device may sample these divergent frequencies in just one datagram. Alternatively, the client device may have (as is conventional) a receiver for cellular, a receiver for WiFi, and so on. Each such receiver in the client device may thus be tuned to a particular client device such that the client device would upload the various datagrams rather than just one datagram. Regardless of how the datagram (or datagrams) are collected, the client device need merely timestamp them as to their time of receipt and upload them to the cloud. The cloud may then correlate the client datagrams with the corresponding sniffer datagrams to determine through a time-difference-of-arrival (TDOA) technique the location of the client device. Just like the wireless sources, the client devices in the disclosed techniques and systems herein require no hardware modifications. Conventional mobile devices may be instead be merely configured with a software download to practice the advantageous position determination disclosed herein.

As noted above, mobile devices may be configured to act as "sniffers" with regard to sampling the wireless sources and uploading a time-stamped series of such samples to a server in the cloud. The resulting time-stamped series of samples is denoted herein as a "datagram." For example, a sniffer such as a handset may take digital samples of the received signal from a wireless source over a certain period of time (e.g., tens of milliseconds). Each sniffer has a relatively accurate clock such as provided by GPS time so that the datagram may be time stamped. Given the sampling rate, the sniffer need merely stamp one sample (e.g., the beginning or ending sample) of the datagram. The remaining samples in the datagram will have a known time of arrival based upon the time stamp for the time-stamped sample. Alternatively, more than one sample in a datagram may have a time stamp.

Figure 3:
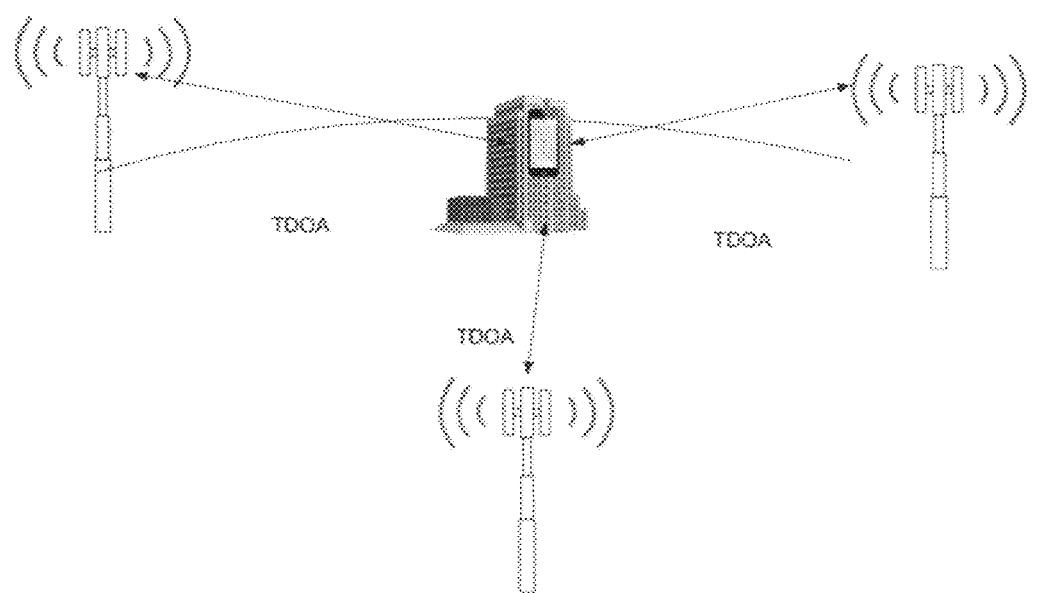
FIG. 3 illustrates a client device in a terrestrial TDOA-based positioning system in accordance with an aspect of the disclosure.

The sniffer uploads the resulting datagram to the cloud. Should a wireless source not have an already known location, the cloud may use datagrams from multiple sniffers to calculate, through a TDOA technique such as used in GPS, the x,y,z location of the wireless source. The client device also uploads a datagram to the server. Note the analogy to a traditional GPS receiver: the receiver needs to have a copy of the PRN sequence transmitted by the satellite. In the present matter, that copy is provided by a sniffer. For example, consider the system shown in FIG. 3. The client device is located in a weak-signal environment but still readily receives signals from three base stations (as discussed above, the received signal power from a relatively-close base station is considerably more powerful than the relatively-weak received satellite signal power such that the client devices disclosed herein may readily sample from a plurality of such terrestrial sources even in a GPS weak-signal environment). The client device uploads a time-stamped datagram (a time-stamped series of samples of the combined RF received signal from the various sources) to the server (not illustrated). Just like a GPS system, the server (or servers) may perform a cross-correlation of the datagram from the client device with the datagram from a sniffer tuned to a particular source to determine the correlation peak for the client's datagram with the sniffer datagram. The four unknowns for the client device: its unknown clock offset to the accurate clock in the sniffers and its x,y,z location may thus be derived from the resulting correlations in the server.

Examples of suitable sources of terrestrial signals for this TDOA position determination include cellular cell sites, WiFi access points, Bluetooth beacons, television transmitters, and radio transmitters. Furthermore, non-stationary wireless communication devices may be employed, such as communication drones and communication satellites in that their current x,y,z location may be readily determined through various techniques, including the use of sniffers as disclosed herein.

Figure 4A:
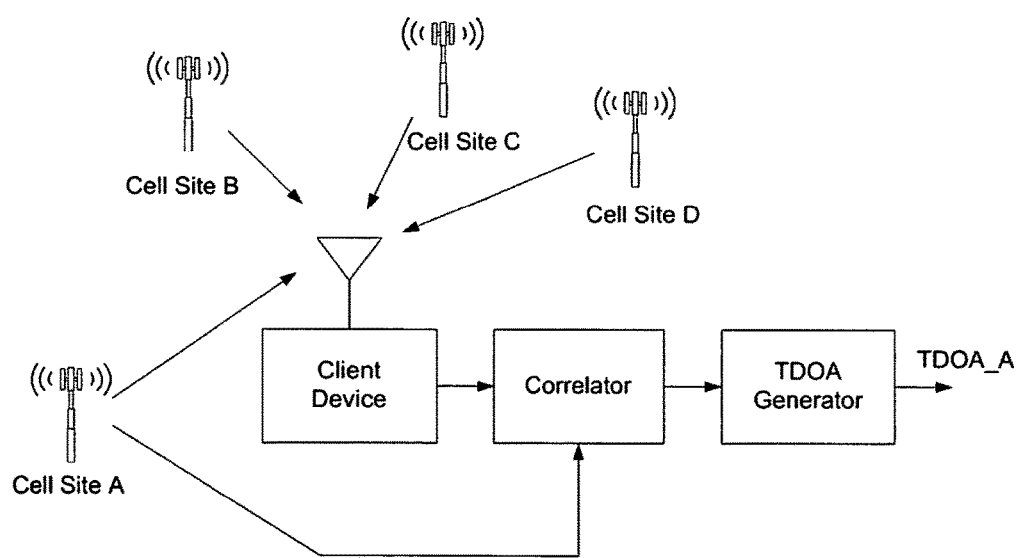
FIG. 4A illustrates a correlator and TDOA generator to determine the location of a client device in accordance with an aspect of the disclosure.
Figure 4B:
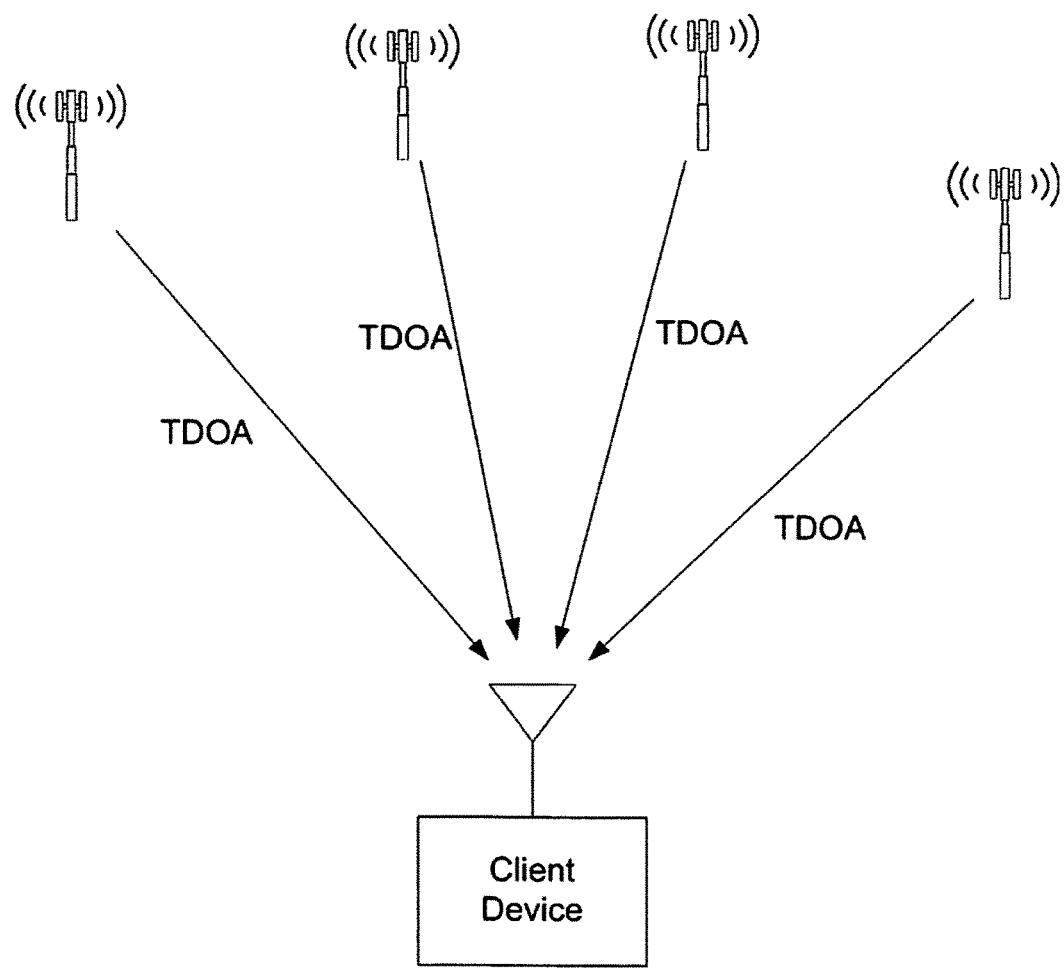
FIG. 4B illustrates four TDOAs being generated for a client device.

FIG. 4A illustrates another embodiment in which a TDOA-based positioning determination is made using terrestrial signals. In this example, the wireless sources are four cellular base stations A, B, C, and D. The composite signal received by the client device is cross correlated in a correlator with a signal replica of the signal transmitted by cell site A. Non-limiting examples of a source of the signal replica signal include, a signal replica signal provided by cell site A or cellular system (active involvement) and/or employing sniffer devices which capture the transmitted signal from cell site A (non-active). Further, if the transmitted signal from a source includes known, predictive or repetitive signals such as pre-amble and packet headers, allowing for the time-stamping of the transmit time of received data, the signal replica may be extracted directly from the receive signal of the client device. Although discussed herein with regard to offline solutions such as in a server, it will be appreciated that the correlator shown in FIG. 4A may be located within the client device. The following discussion will be directed to server-based embodiments but it will thus be appreciated that the correlations disclosed herein may be performed in the client device. The signal replica signal is time stamped as discussed earlier, indicating the precise transmit time the signal transmitted from cell site A. The generation of the signal replica signal will be discussed in further detail below. Cross correlation of the signal received by the client device and the time-stamped signal replica of cell site A is used to determine the TDOA between a transmitter and a receiver. FIG. 4B illustrates that the TDOA information between a client device and four wireless communication devices may be used to solve for the x,y,z, location coordinates of a client device as well as its unknown clock offset to the accurate time used by the sniffers. As the location of the four cell sites are known, a navigational equation can be derived using the derived TDOA. Using the four navigational equations allow for a unique solution of the four unknowns to be determined: X, Y, and Z coordinates, and clock offset of the client device.

Figure 5:
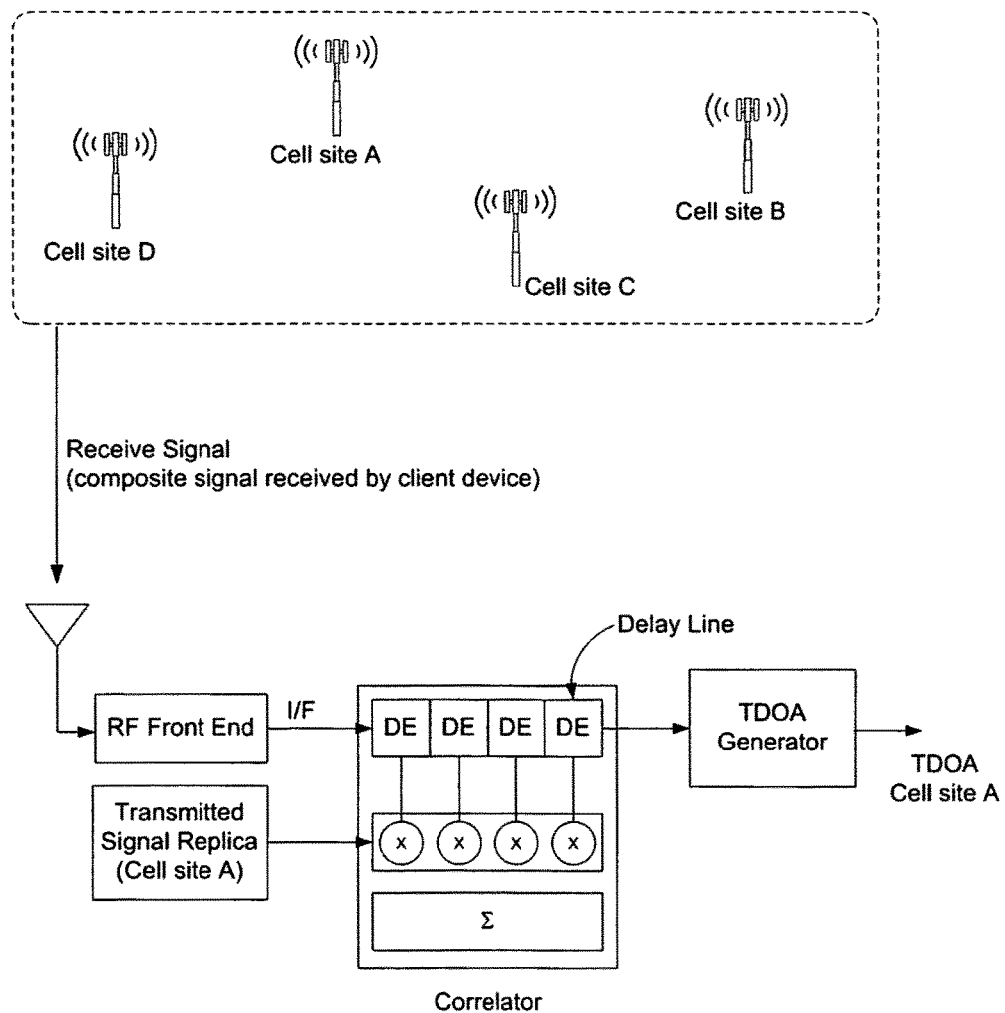
FIG. 5 illustrates additional details for the correlator of FIG. 4A.

FIG. 5 illustrates an example of signal processing employed to determine the TDOA between a wireless source and a client device, in this example cell site A. The composite signal received by the client device (receive signal) is correlated against a replica of the signal that was transmitted by the cell site A (signal replica). The correlator determines the receive or arrival time of the received signal from a cellsite by using the well-understood process of cross correlation. Multiple correlator blocks in parallel may be used in order to acquire TDOA information from multiple wireless communication devices simultaneously. For the purpose of this discussion, we will focus on the operation of a single correlator block. The composite digital signal that is received by the client device is input to a delay line made up of multiple delay elements. Corresponding samples from a transmitted signal replica for the specific wireless source that is being acquired are multiplied with the output of each delay element. The product of each delayed signal and samples from the transmitted signal replica are summed and processed in a TDOA generator. The TDOA is determined between the client device and individual cellsites. The local time of arrival is the local clock tick associated with the time of arrival of the signal that creates the largest correlation peak. The Time Difference of Arrival is the difference between the time of arrivals from two different transmitters. The obtained TDOAs are used to determine the location coordinates of a client device by employing, as an example, trilateration.

The accuracy of the location coordinates that are generated for the client device improves as the number of wireless communication devices for which a TDOA can be determined increases. Further, the signals received by the client device from wireless communication devices, even in close physical proximity may be weak, inhibiting the ability to determine the TDOA. It is well known in the signal processing arts that the signal-to-noise ratio (SNR) for a weak received signal can be improved through extended coherent integration. However, in contrast to GPS, the "PRN" sequence for a networking wireless source such as a base station does not end. There are thus no navigation bit boundaries that must be accounted for as the length of the datagrams is increased. But as will be explained herein, one cannot simply increase the number of samples in a datagram indefinitely. In that regard, extending the coherent cross-correlation between the client device datagram and the sniffer datagram is inhibited by at least two factors: a) frequency off-set caused by carrier frequency off-set and Doppler shift, and b) by time offset caused by uncertainty of the local clock of the client device.

Figure 6:
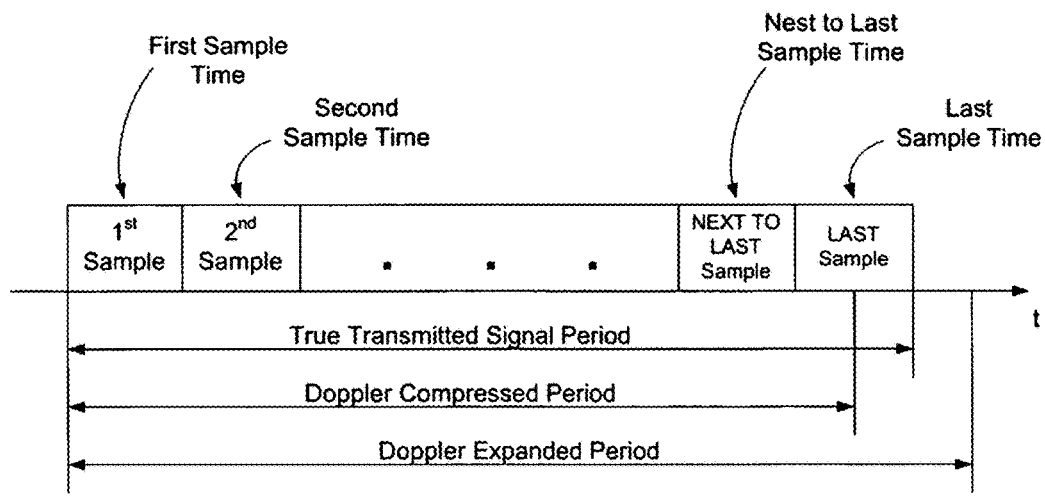
FIG. 6 illustrates the effect of Doppler on the sampling of a client (or server) datagram.

Doppler shift causes the same effect on the sampling as does the receiver sampling rate. For example, suppose a client device has a very accurate clock such as an atomic clock. The effect of the clock drift for such a clock is negligible unless an enormous time sequence of the received signal is being cross-correlated and coherently summed. But the client device clock accuracy cannot change the physics of the Doppler effect: the apparent period or length of a received signal sequence is either increased or decreased by the Doppler. In other words, the time scale for the received signal sequence is either too fast or too slow. For example, if a client device is moving toward a cellsite, the Doppler shift is positive. The received signal will not have their nominal timing in such a scenario but instead will be compressed in time (having a faster apparent time scale). Even if the client device clock ticks perfectly (no sampling rate errors), the Doppler compressed received signal will be too short as shown in FIG. 6. Conversely, if a client device is moving away from a wireless communication device, the Doppler shift is negative (the apparent time scale for the received signal is too slow). The received signal will again not have their nominal length in such a scenario but instead will be expanded in time as also shown in FIG. 6.

For example, suppose the expansion or compression is 2.5% of a sample period. That means that even if a first sample is centered perfectly in the sampling time period, a final sample will be displaced by 2.5% of the sample period times the number of samples N in the datagram from where it should have been sampled (if Doppler shift were accounted for). The same failure in coherent integration as discussed above with regard to the sampling rate will level off the coherent integration gain. The effects of Doppler shift and receiver sampling rate makes the transmitted signal replica desynchronized with the samples of the received signal. For this reason, conventional coherent integration techniques have always been unsatisfactory and do not boost performance in weak-signal environments. The following discussion is directed to the processing of relatively long datagrams such that the drift of the local clock in the client device (and sampling rate) and/or Doppler effects would otherwise cause error if the relatively long datagram were simply cross-correlated with the replica. Note that the sniffer devices have accurate clocks such that the replica signals are relatively "perfect" with regard to clock drift errors.

Example Embodiments

The deleterious effects of sampling-rate error and Doppler on the sampling of the received signal of a client device may be avoided by a constructive resampling. The resampling is "constructive" because one cannot go back in time and actually sample the received signal at the proper sampling rate. But because of the sampling rate and the Doppler shift, the received signal will typically be sampled at too fast of a rate or too slow. If the received signal could have been sampled at the proper clock rate—one that has no sampling-rate error and is also increased or decreased to account for Doppler-shift-induced expansion or compression of the apparent time scale for the received signal—then the samples of the received signal and corresponding samples of the transmitted signal replica are synchronous. Given such a re-alignment of the re-sampled received signal with the samples of the transmitted signal replica, a sufficient length of the received signal may then be cross-correlated with the appropriate transmitted signal replica and coherently added to solve the weak-signal dilemma for determining the TDOA of signals transmitted by a cellsite and received by a client device. This re-sampling may alternatively be performed on the transmitted signal replica.

The alignment of the received signal and the transmitted signal replica can be performed in the time domain or in the frequency domain. A time-domain embodiment will be discussed first.

Time Domain Re-Sampling

As discussed above, a received signal can be compressed or expanded in time depending upon its Doppler shift. Such a compression or expansion is with reference to a "true" time for the received signal in the absence of a Doppler shift. Such misalignment of the received signal with the true time scale is independent of the client device clock rate. But as also discussed above, the client device clock rate itself may be too fast or too slow with reference to such a true time scale. On the other hand, the transmitted signal replica is generated according to the true time scale. The transmitted signal replica can be cross-correlated with the corresponding received signal in either the time domain or the frequency domain. Analogous cross-correlation in the time or frequency domains is well known with regard to the conventional cross-correlation of a single received signal with a transmitted signal replica.

Figure 7:
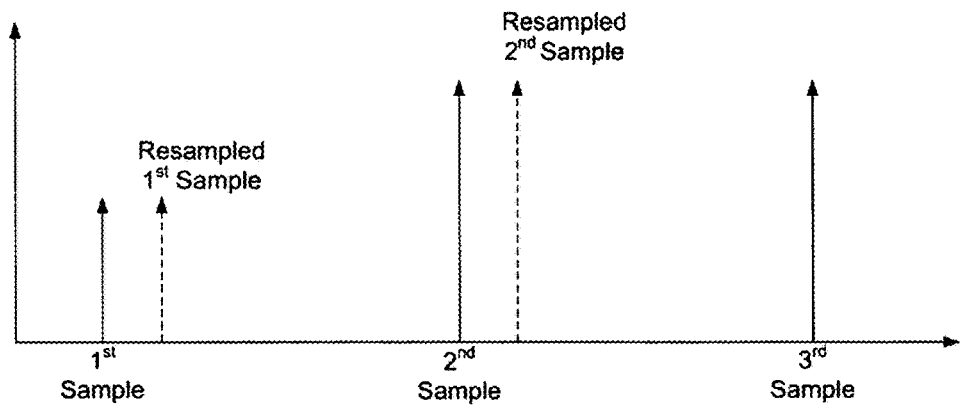
FIG. 7 illustrates the resampling of a datagram.

But regardless of whether the cross-correlation is performed in the time or frequency domain, the transmitted signal replica are generated as time samples corresponding to the time samples of the received signal. Since a client device in a weak-signal environment has not yet acquired a position fix, its sampling rate is unknown. In generating a transmitted signal replica in such a case, the client device thus has no information on how fast or slow its clock is ticking. It can only assume that the clock is sampling according to a nominal or intended sampling rate. The transmitted signal replica is thus generated according to this intended sampling rate and "true" time scale. But such an intended sampling rate will fail because it does not account for the Doppler shift or the client device sampling rate error. The sampling by the client device is thus resampled as shown in FIG. 7.

Figure 8:
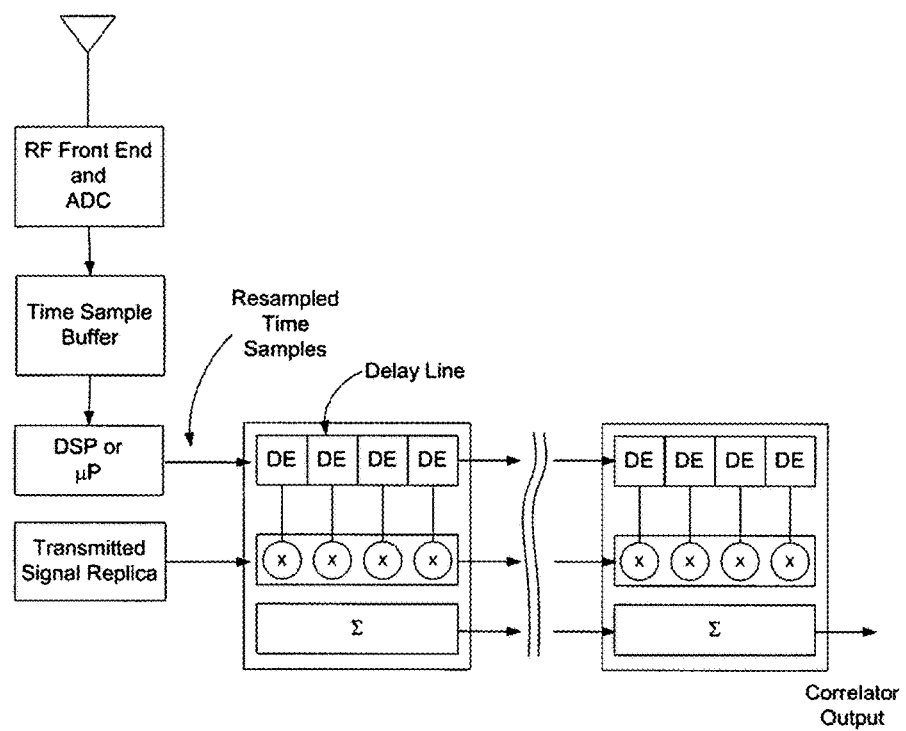
FIG. 8 illustrates a time-domain correlator for a resampled datagram.

FIG. 8 illustrates an implementation example. An RF front end and analog-to-digital converter (ADC) receives the received signal on an antenna and digitizes the received signal to form time samples of the received signal in a client device. The resulting original time samples are stored in a sample buffer. After uploading the resulting datagram to a server (or preformed in the client device), a microprocessor may then re-sample the original time samples at each of the desired test points or values across a search range for an effective sampling rate. The re-sampled time samples for a given tested effective sampling rate may then be correlated in correlators. Correlators are shown separately to comport with the description of the correlator of FIG. 5. In other words, each correlator includes the delay line for a corresponding transmitted signal replica from a specific cellsite. If the received signals samples (as represented by re-sampled time samples) are to be cross-correlated with corresponding samples of the transmitted signal replica and then coherently summed, there would be a corresponding number of correlators. A coherent sum for each effective sampling rate may then be compared to the other coherent sums for the remaining effective sampling rates in a detection module (not illustrated but discussed below with regard to FIG. 8) to find the maximum value and determine the arrival times of the received signals accordingly. Although such a time-domain cross-correlation is theoretically possible, it is much more convenient to perform the cross-correlation in the frequency domain as shown in FIG. 9.

Figure 9:
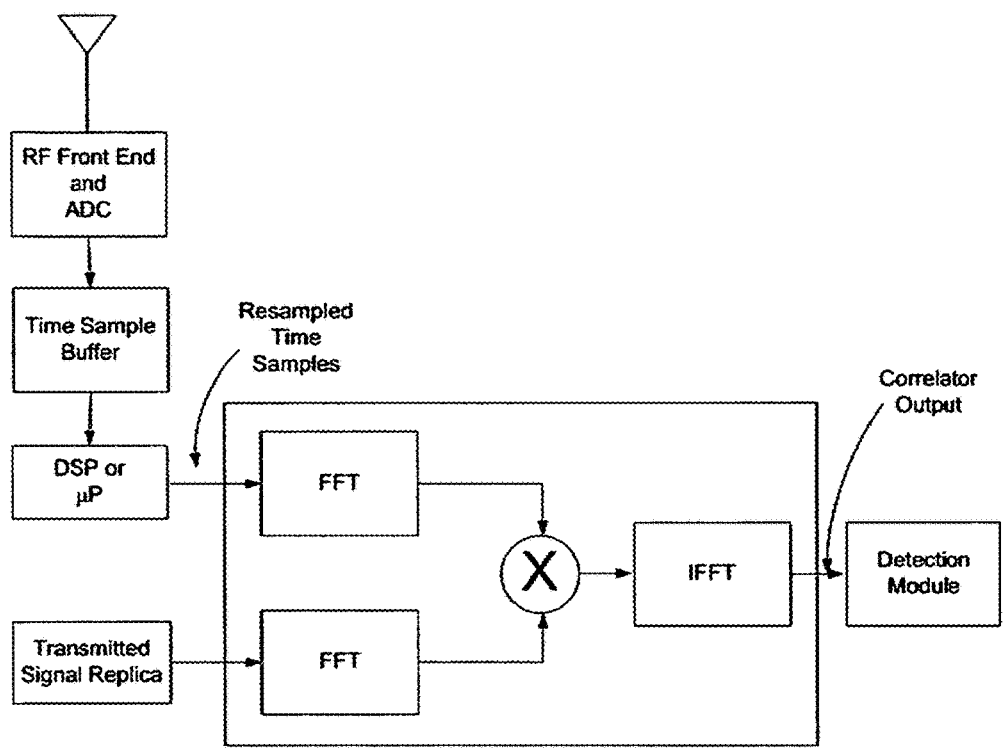
FIG. 9 illustrates a frequency-domain correlator for a resampled datagram.

The processing shown in FIG. 9 is analogous to what was described in FIG. 8, except that time-domain correlators are replaced by a frequency domain correlator. In a frequency domain correlator, the resampled time samples for the received signal and the samples for the transmitted signal replica are each converted into the frequency domain by, for example, FFT operations. The resulting FFTs may then be multiplied before being converted into a resulting coherent sum of all the cross-correlations using an inverse FFT operation. In other words, all the cross-correlations for each received signal with its corresponding transmitted signal replica are accomplished by merely multiplying their corresponding FFTs and then performing an IFFT. For this reason, cross-correlation is typically performed in the frequency domain. A detection module detects the maximum cross-correlation value.

It will be appreciated that the re-sampling discussed above could instead be practiced on the samples of the transmitted signal replica. For example, the resampling operation performed by DSP/microprocessor may instead be performed on the transmitted signal samples. The FFT for the transmitted signal replica would then be an FFT of the re-sampled transmitted signal replica. The samples of the received signal would then be processed by frequency-domain correlator without any re-sampling. However, the samples of the transmitted signal replica would be re-sampled. Since either the samples of the received signal or the transmitted signal replica samples can be chosen for re-sampling, the samples that are not re-sampled may be referred to as not-re-sampled samples. In both cases, re-sampled samples are cross-correlated with not-re-sampled samples. If the received signals are re-sampled, the not-re-sampled samples are the transmitted signal replica samples. Conversely, if the transmitted signal replica samples are re-samples, the samples of the received signal would be the not-re-sampled samples.

Note that the signal processing techniques may be performed offline—they do not need to be performed in the receiver taking the samples of the received signals. Instead, such a receiver could upload the received samples to a server or other external node that would then perform the resampling and coherent addition discussed herein. Such offline processing is attractive for applications such as handsets that may not have sufficient computing power to perform the re-sampling and coherent addition of the resulting cross-correlations.

Frequency Domain Re-Sampling

As yet another alternative, the effective resampling of the received signal may be performed in the frequency domain through an appropriate filtering operation. As discussed with regard to the time-domain resampling, the re-sampling filtering may be performed on either the FFT of the samples for the received signal or on the FFT of the transmitted signal replica. For example, the time-domain re-sampling by the DSP/microprocessor would be omitted. Instead, a re-sampling filter would be inserted between the FFT operation and the subsequent multiplication for either the received signal sample path or the transmitted signal replica path. As discussed with regard to the time-domain embodiment, a frequency domain re-sampling need not be performed by the receiver taking the samples of the received signal.

Additional Embodiment

Figure 10:
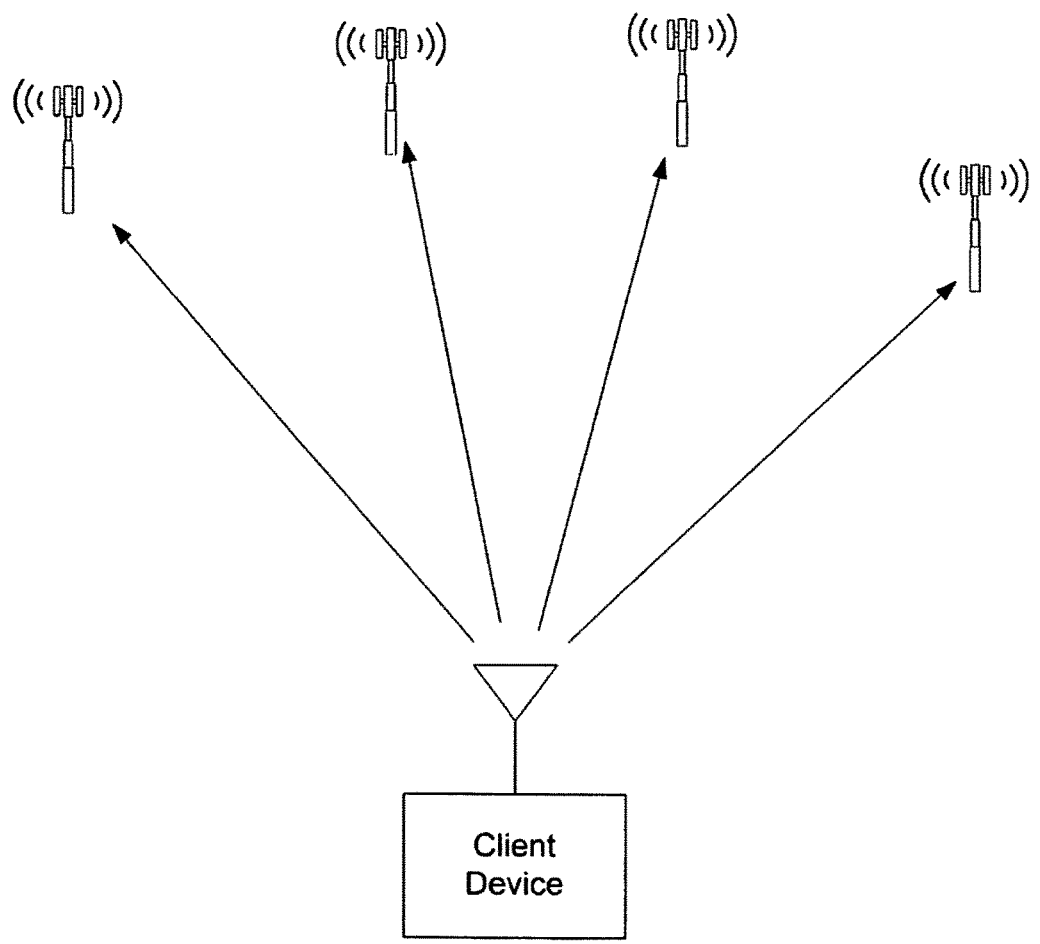
FIG. 10 illustrates a client device acting as a wireless source.
Figure 11:
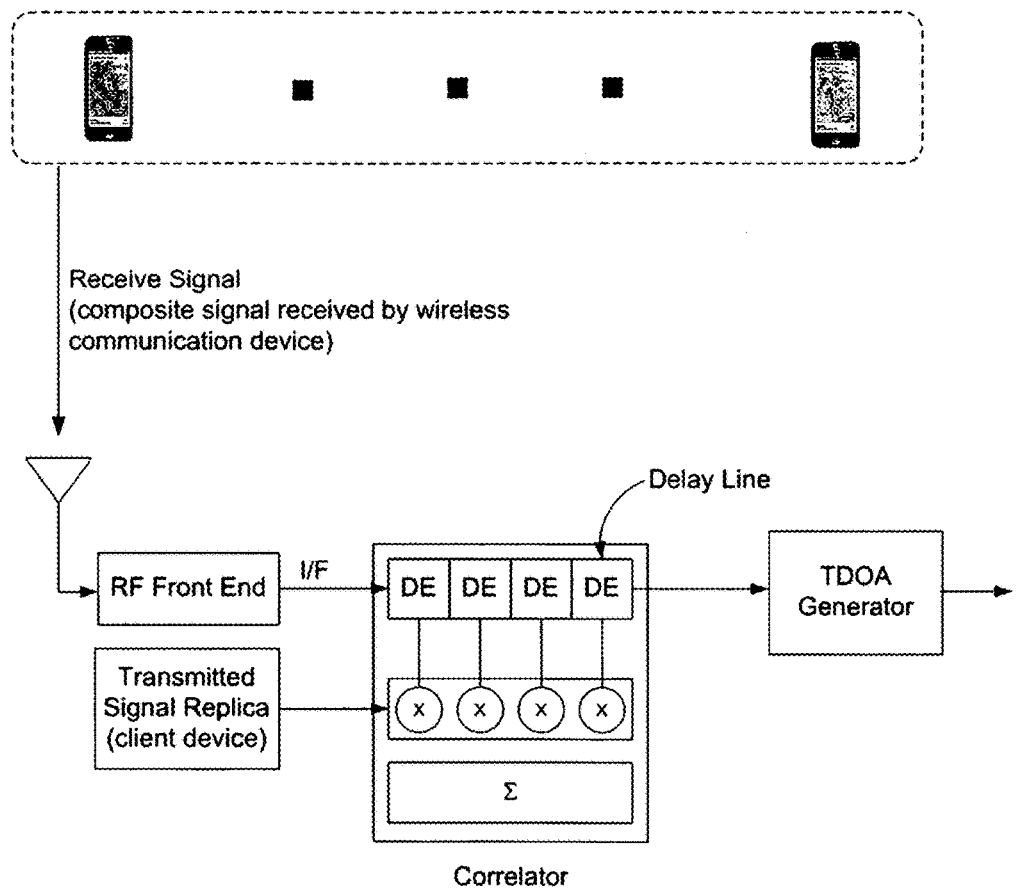
FIG. 11 illustrates a correlator for a datagram from the client device of FIG. 10.

Another embodiment is shown in FIG. 10 and FIG. 11 where the TDOA information between a client device and one or more wireless communication devices using signals transmitted by the client device and received by the individual wireless communication devices. It is essentially obtaining the same information using the opposite implementation as what was described by FIG. 4 and FIG. 5.

FIG. 11 illustrates an example of signal processing employed to determine the TDOA between a wireless source and a client device. The composite signal received by the wireless communication device (receive signal) is correlated against a replica of the signal that was transmitted by a client device (transmitted signal replica). The correlator determines the receive or arrival time of the receive signal from a client device by using the well-understood process of cross correlation. The composite digital signal that is received by the wireless communication device is input to a delay line made up of multiple delay elements. Corresponding samples from a transmitted signal replica for the specific client device that is being acquired are multiplied with the output of each delay element. The product of each delayed signal and samples from the transmitted signal replica are summed and processed in a TDOA generator. The TDOA is determined between the wireless communication device and client device. The obtained TDOAs between the client device and multiple wireless communication devices are used to determine the location coordinates of the client device employing, as an example, trilateration. Further, the resampling techniques discussed in FIG. 8 and FIG. 9 in order to increase SNR are equally applicable to the implementation example shown in FIG. 11. Further, the above implementations using signal processing in either the time domain and frequency domain apply to the embodiment shown in FIG. 11.

Cloud Processing

Figure 12A:
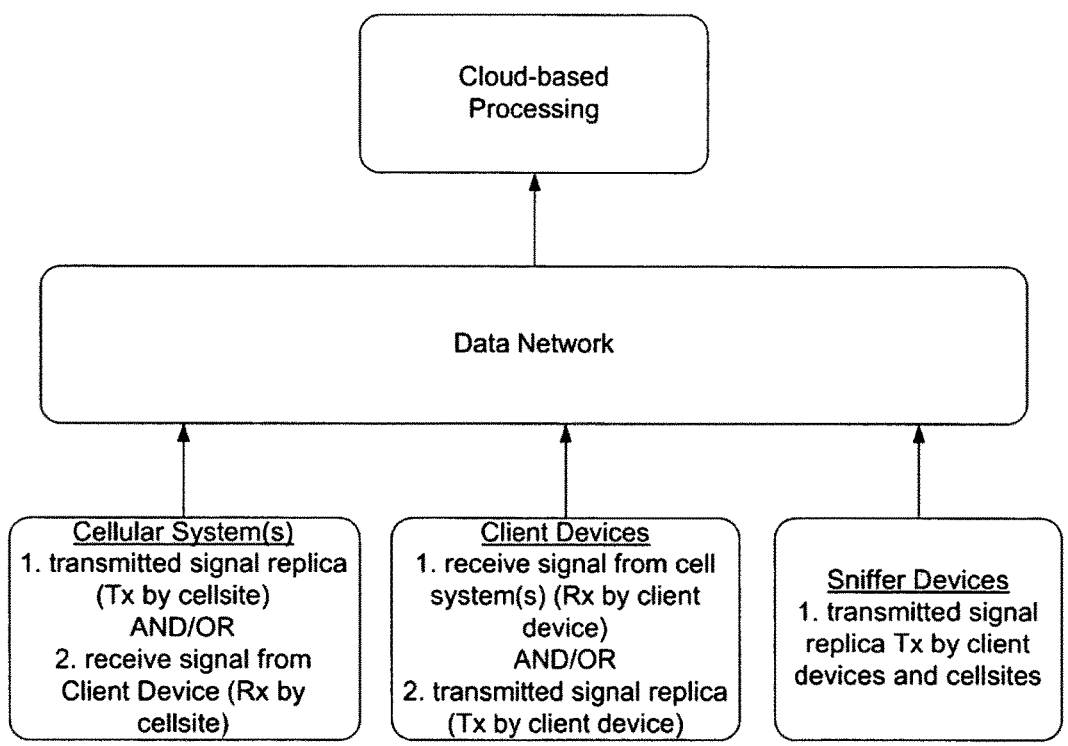
FIG. 12A illustrates aspects of cloud-based processing in accordance with an aspect of the disclosure.

The embodiments discussed above may be performed using cloud-based resources. This includes, but not limited to, signal processing and coordinate generation. Transmitted signal replica and receive signals may be upload on a real-time or not real-time basis using a wide variety of data communications options. This is generally shown by FIG. 12A. Furthermore, sniffer devices may be employed by the system to provide the necessary signal to generate the transmitted signal replica signals from either individual client devices (as would be needed by the implementation shown in FIG. 10), or for individual wireless communication devices (as would be needed by the implementation shown in FIG. 4)

Determining Wireless Communication Device location and Signal Replica

Figure 12B:
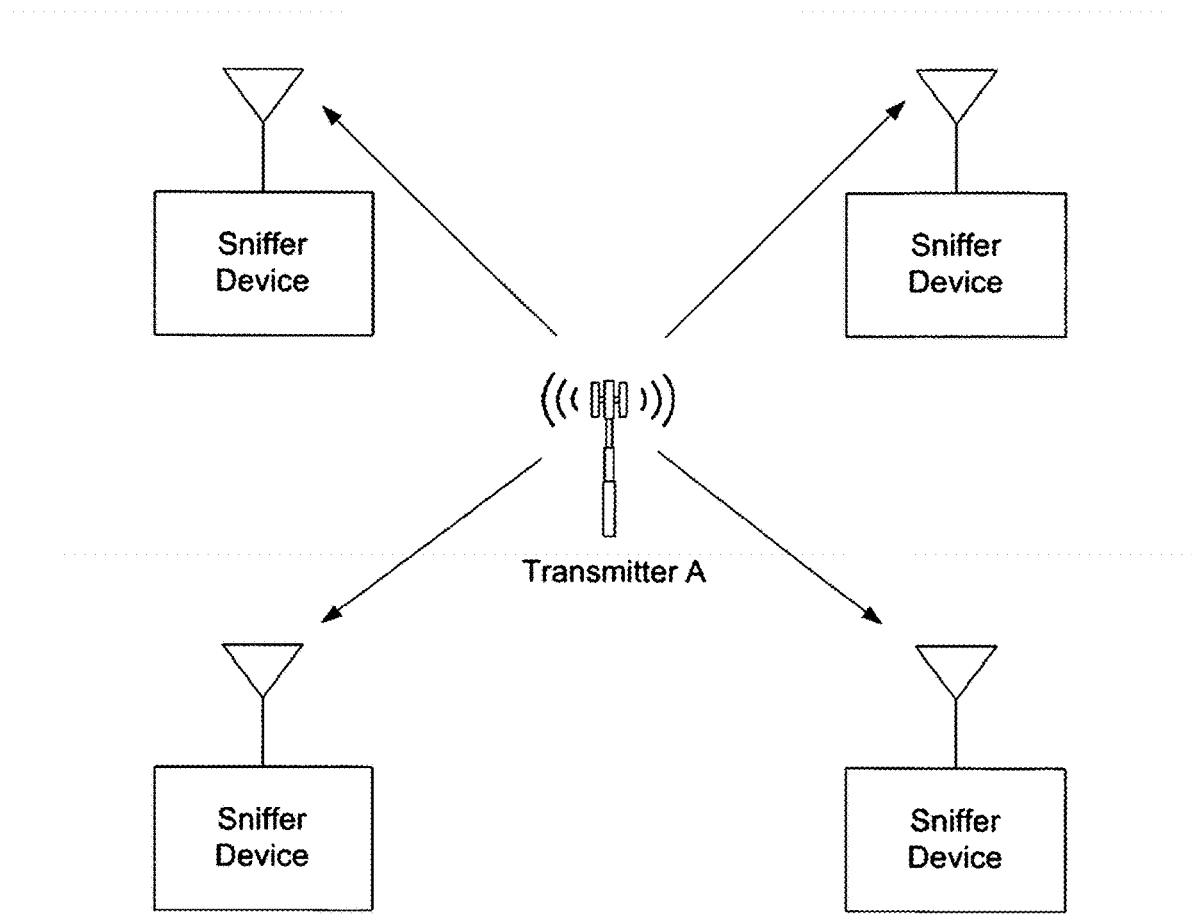
FIG. 12B illustrates a collection of four sniffer devices.

As mentioned, it is necessary to know the location coordinates of a wireless communications device (the wireless source such as the base stations of FIGS. 3, 4A, 4B, and 5). FIG. 12B illustrates one embodiment which employs sniffer devices to determine the location coordinates of transmitter A. The location of each sniffer device is known (such as through GPS or another satellite-based positioning system). Further, the local clock of each sniffer device is calibrated to precise time (e.g., GPS time). For example, the sniffer devices may contain a GPS receiver which may be used to provide location coordinates and clock calibration. Using the time of arrival (TOA) of the signal transmitted by transmitter A and received at each sniffer device, the location of transmitter A can be uniquely determined. In this example, the TOA received by four sniffer devices with known XYZ coordinates and a local clock calibrated to precise time provides four equations to solve for the four unknown variables of transmitter A; XYZ coordinates and its local clock offset from precise time.

Figure 12C:
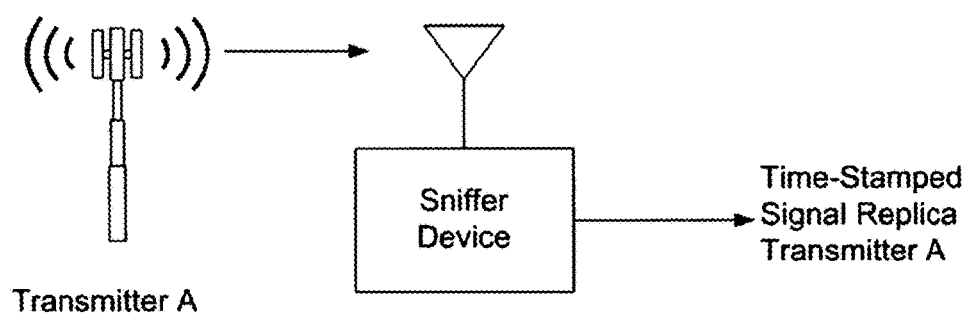
FIG. 12C illustrates the collection of a time-stamped sniffer datagram.

FIG. 12C illustrates how a sniffer device can provide a time-stamped signal replica of the transmissions from a wireless communications device (a wireless source). The transmitted signal from a specific wireless communication device is detected and captured by the sniffer device. The sniffer distinguishes and selects the signal from a specific wireless communication device by using various selection criteria, including RSSI, carrier frequency, and embedded information in the signal such as header/preamble information. The time-stamping of the signal replica signal may be achieved based on the known location of the wireless communications device and sniffer device and that the local clock of the sniffer device is calibrated to precise time. Since the location of both the wireless communication device and the sniffer device is known, the precise travel time of a signal between these two devices is precisely known. The transmit time of signals transmitted by the wireless communication device is estimated by subtracting the travel time from the receive time by the sniffer device. This is quite advantageous as the wireless source needs to have no modifications with regard to time stamping its transmissions yet the datagrams (a series of samples of the transmissions from the wireless source at the sniffer) may be readily time-stamped with regard to the time of transmission from the wireless source.

Further, since the signal replica signals are used as a reference signal only, the decoding of any data contained in the transmitted signal is not required. The signal replica data is used in a similar manner to the PRN codes are used to determine ranging information between a GPS satellite and a GPS receiver. In other words, even is the wireless source is transmitting digital data, there is no need to decode the digital data. Indeed, the transmissions from the wireless source may be entirely analog. In that regard, the signal replica may include any type of transmitted signal, including analog and/or digital signals, as well as signals that are encrypted. This allows for a wide variety of communication devices to be utilized for the purpose of providing ranging information in order to locate a client device. For examples, any cell site, regardless of service provider, any WiFi access point, regardless if a client device has access, can be used to locate the client device.

MIMO Processing

The receiver performance can be improved by using multiple antennas. The received signal from multiple antennas can be combined to improve the signal to noise ratio (SNR) and as a result, improve the quality and accuracy of the TDOA estimation. Further, a MIMO engine is capable of estimating the Direction of Arrival (DOA) of the received signals. The DOA and TDOA can be combined to improve the TDOA estimation and resolve the multi-path ambiguity by eliminating the multipath signal that affects the TDOA estimation.

Figure 13:
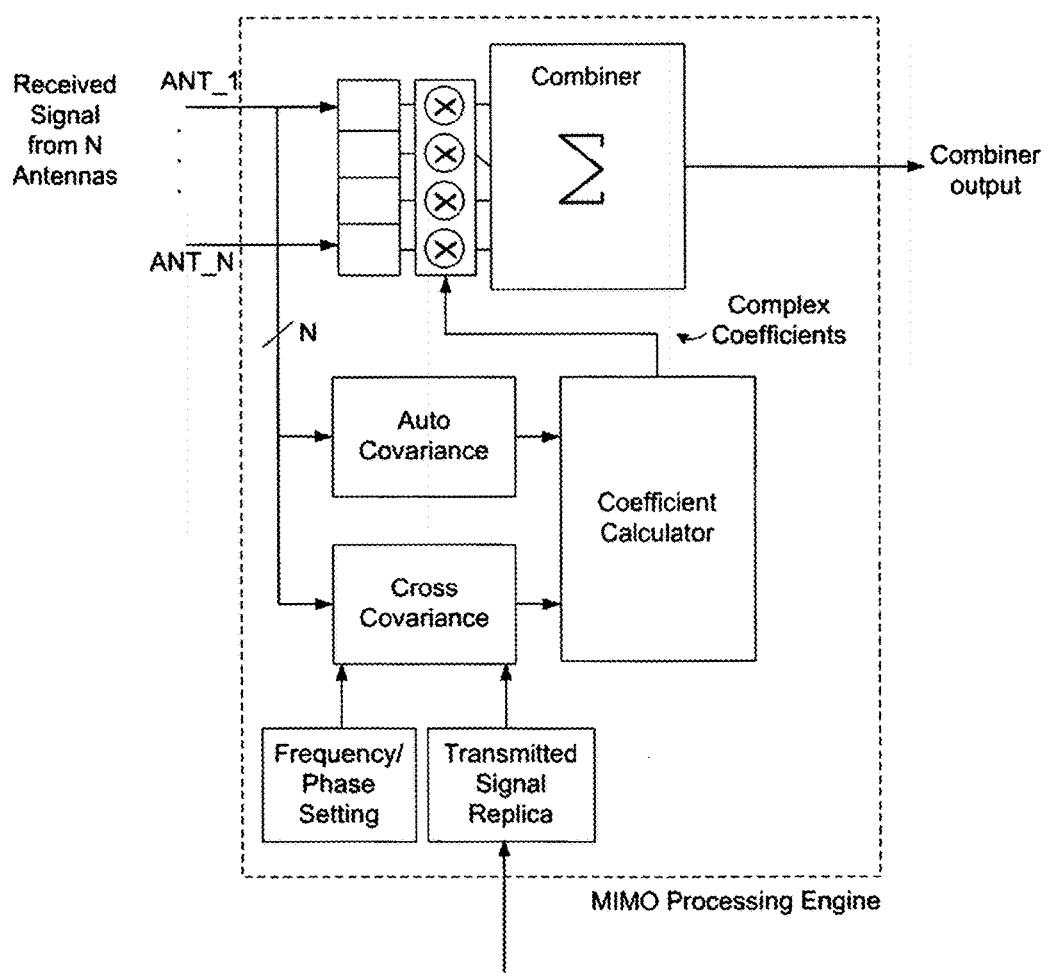
FIG. 13 illustrates a MIMO processing engine.

FIG. 13 shows a non-limiting example of the MIMO processing engine. The complex received signals from N antennas (ANT_1 to ANT_N) are multiplied by complex coefficients calculated by the coefficient calculator. The multiplier outputs are summed in the combiner block. The combined output which is a complex data stream is used for the correlation process. The coefficients are calculated by the coefficient calculator block by multiplying the inverse of the auto covariance matrix of the received signal from multiple antennas and the cross covariance of the received vector from multiple antennas by the transmitted signal replica. The combiner output is fed to the correlator. The correlator function is equivalent to that described with regard to FIG. 5. The transmitted signal replica can be resampled and the frequency shifted to match the frequency offset and sampling frequency of the received signals.

Figure 14:
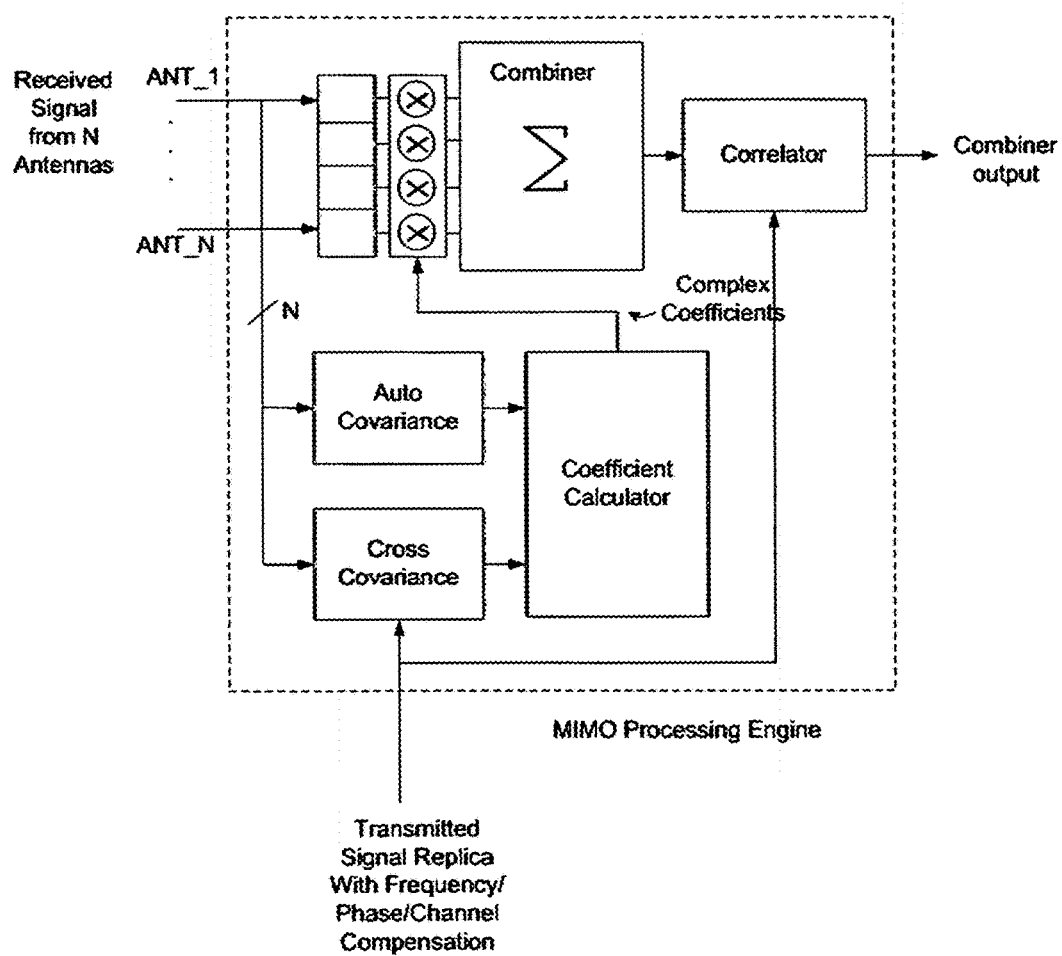
FIG. 14 illustrates a MIMO processing engine.
Figure 15:
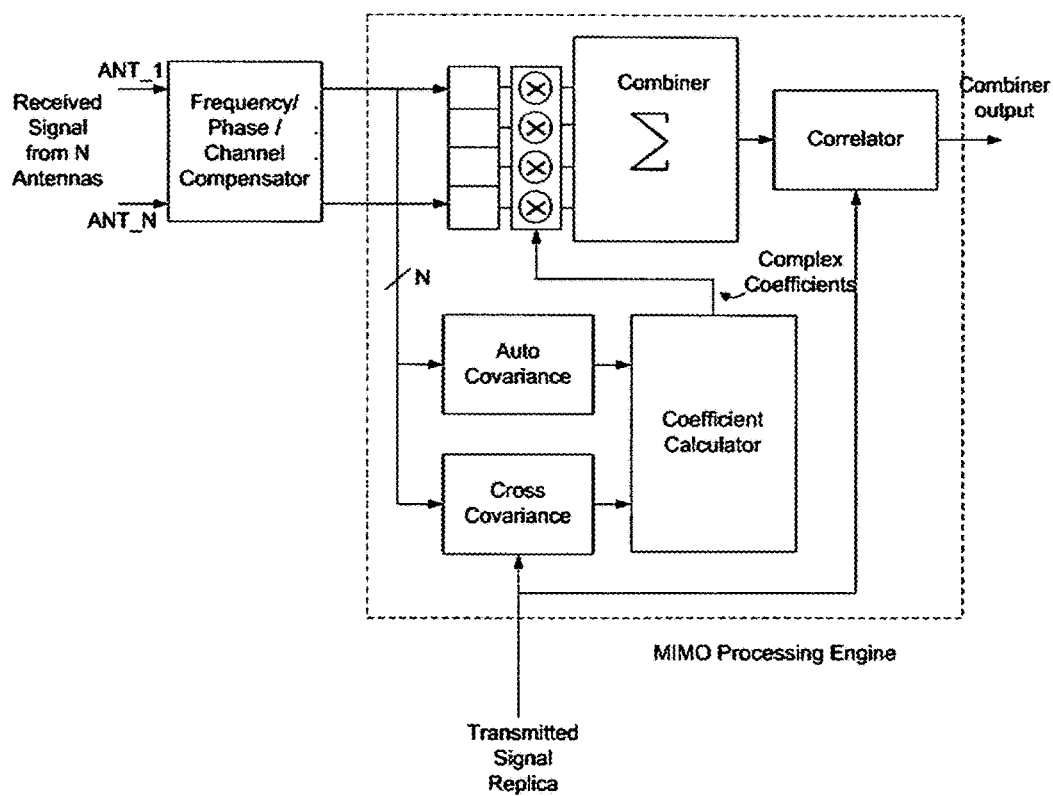
FIG. 15 illustrates a MIMO processing engine.
Figure 16:
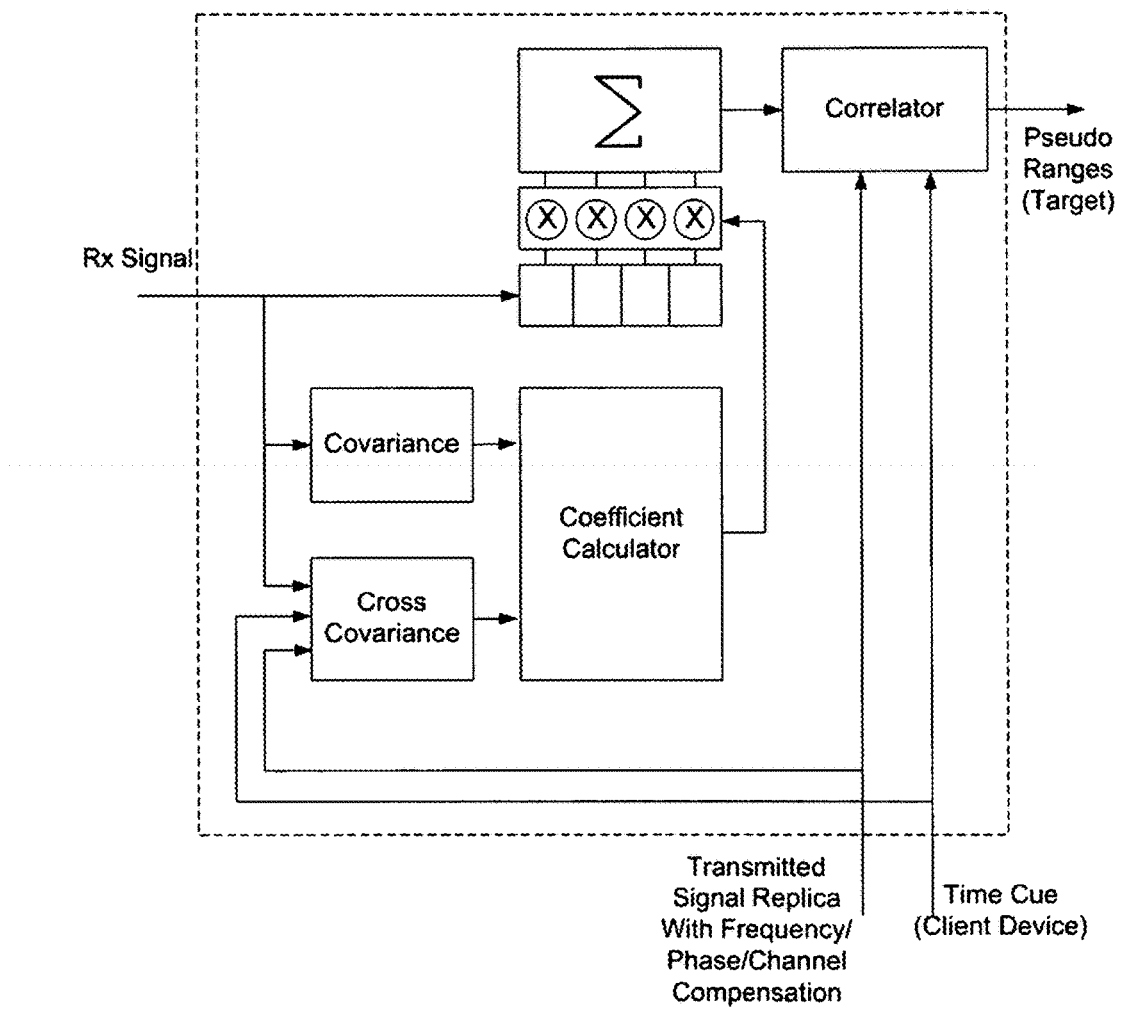
FIG. 16 illustrates a MIMO processing engine.
Figure 17:
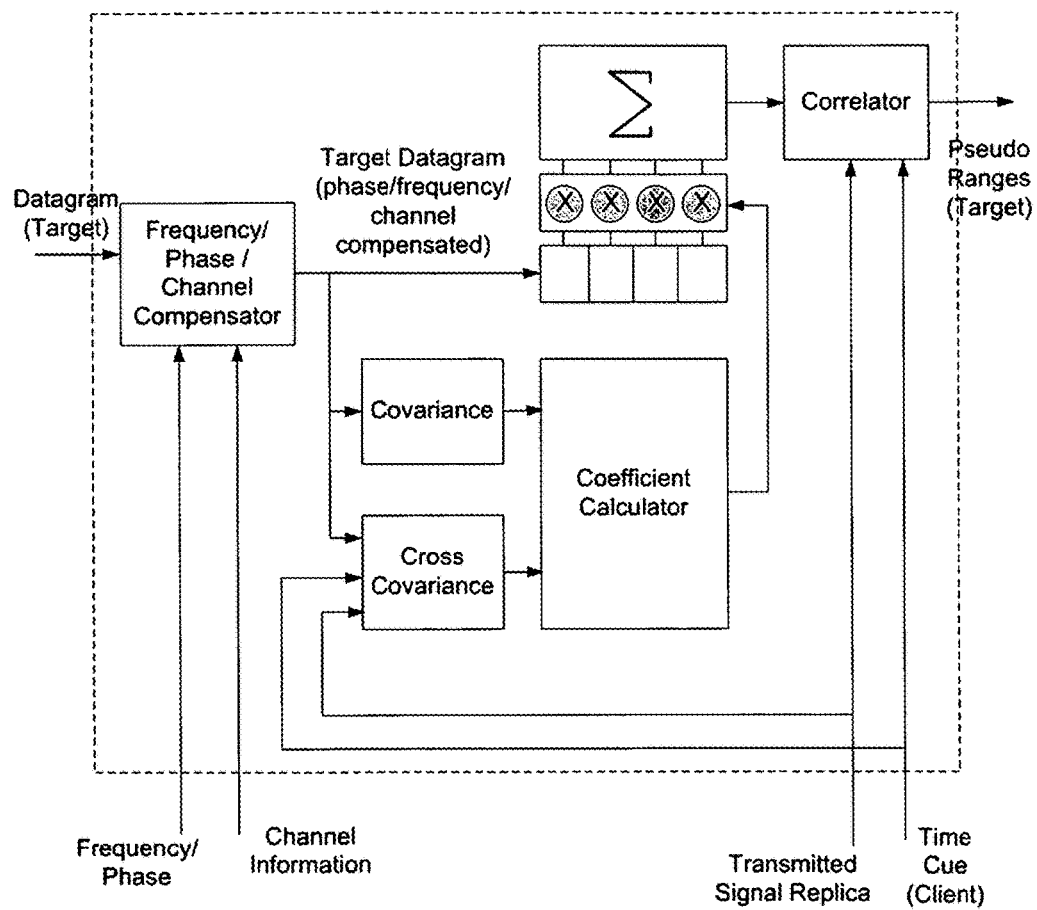
FIG. 17 illustrates a MIMO processing engine.

FIG. 14 illustrates another embodiment of the invention where the transmitted signal replica signal is resampled and frequency shifted to remove the inaccuracy in the sampling frequency and carrier offset of the received signals. FIG. 15 illustrates another embodiment of the invention where the receive signal is resampled and frequency shifted to remove the inaccuracy in the sampling frequency and carrier offset of the received signal. The search window for the correlation used in the MIMO signal processing discussed with regard to FIG. 14 may be narrowed based upon a time cue (time of sampling) from the client device as shown in FIG. 16. Similarly, the search window for the correlation used in the MIMO signal processing discussed with regard to FIG. 15 may be narrowed based upon the time cue from the client device as shown in FIG. 17.

Figure 18:
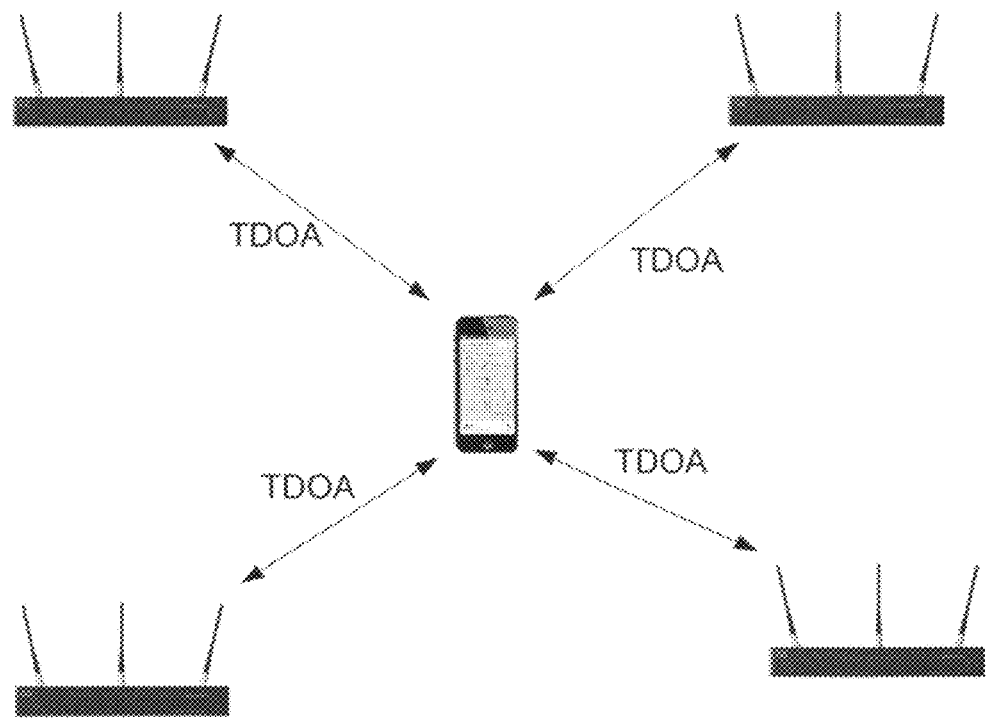
FIG. 18 illustrates a client device being located using WiFi hotspots.
Figure 19:
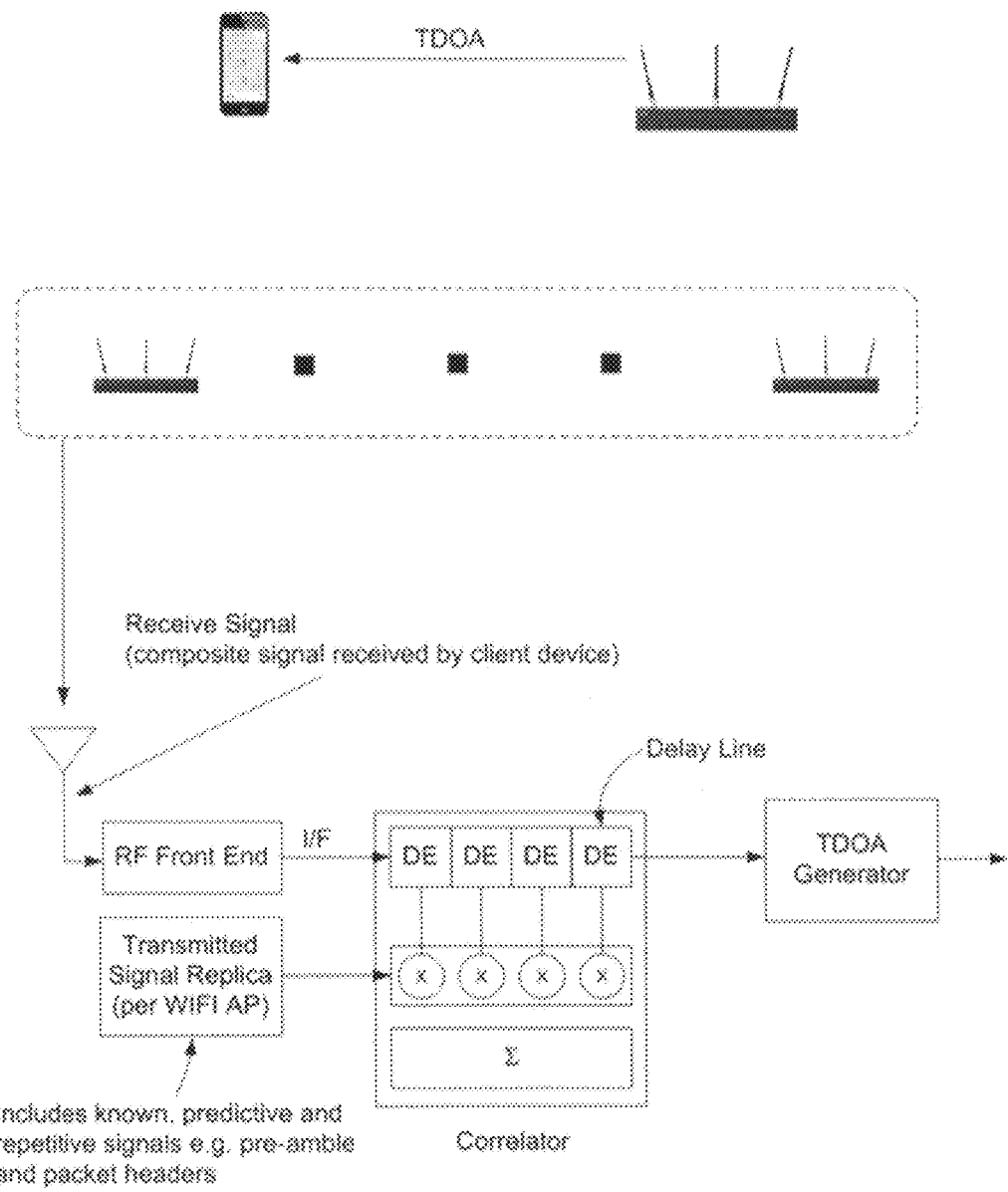
FIG. 19 illustrates the correlation for the client device of FIG. 18.

In another embodiment of the invention the Direction of Arrival (DOA) can be estimated by using multiple antennas. The DOA can be estimated by using a steering vector and finding the cross correlation of the received signal from multiple antennas and the steering vector. The DOA can be estimated by scanning the angle of the steering vector. The angle of arrival can be used to filter the received signal to eliminate the multipath signal from the unwanted directions. In addition, the DOA can be fed to the navigation engine and add constraints to the navigation equations WiFi Sources In another embodiment, the location coordinates may be determined using ranging information via TDOA information obtained by processing transmitted and received WiFi signals, as shown in FIG. 18. In one embodiment, as shown by FIG. 19, the composite signal of the WiFi system frequency band received by the client device (receive signal) is correlated against a replica of the signal that was transmitted by a WiFi Access Point (transmitted signal replica). The correlator determines the receive or arrival time of the receive signal from a WiFi Access Point by using the well-understood process of cross correlation. Multiple correlator blocks in parallel may be used in order to acquire TDOA information from multiple WiFi Access Point simultaneously. For the purpose of this discussion, we will focus on the operation of a single correlator block. The composite digital signal that is received by the client device is input to a delay line made up of multiple delay elements. Corresponding samples from a transmitted signal replica for the specific cell site that is being acquired are multiplied with the output of each delay element. The product of each delayed signal and samples from the transmitted signal replica are summed and processed in a TDOA generator. The TDOA is determined between the client device and individual WiFi Access Points. The local time of arrival is the local clock tick associated with the time of arrival of the signal that creates the largest correlation peak. The Time Difference of Arrival is the difference between the time of arrivals from two different transmitters. The obtained TDOAs are used to determine the location coordinates of a client device by employing, as an example, trilateration.

Figure 20:
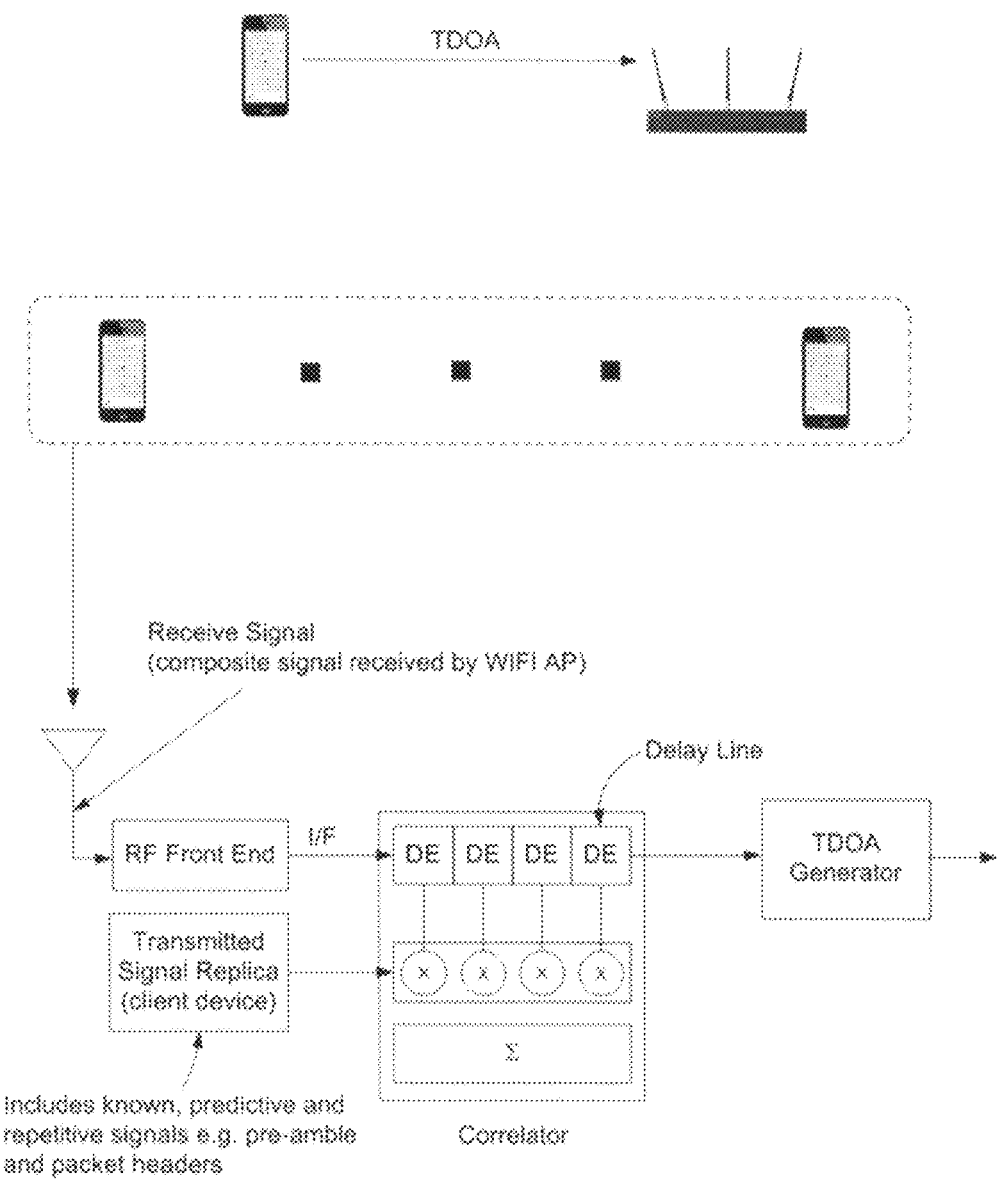
FIG. 20 illustrates the correlation for the client device of FIG. 18.

FIG. 20 illustrates an example of signal processing employed to determine the TDOA between a WiFi Access Point and a client device. The composite signal of the WiFi system frequency band received by WiFi Access Points (receive signal) is correlated against a replica of the signal that was transmitted by a client device (transmitted signal replica). The correlator determines the receive or arrival time of the receive signal from a client device by using the well-understood process of cross correlation. The composite digital signal that is received by the WiFi Access Point is input to a delay line made up of multiple delay elements. Corresponding samples from a transmitted signal replica for the specific client device that is being acquired are multiplied with the output of each delay element. The product of each delayed signal and samples from the transmitted signal replica are summed and processed in a TDOA generator. The TDOA is determined between the cell site and client device. The obtained TDOAs between the client device and multiple cell sites are used to determine the location coordinates of the client device employing, as an example, trilateration.

Further, all of the techniques relating to frequency offset and time offset correction described for determining the TDOA information using transmitted and received cellular signals may also be applied to transmitted and received WiFi Signals. Further, all of the techniques relating to MIMO processing described for determining the TDOA information using transmitted and received cellular signals may also be applied to transmitted and received WiFi Signals. In addition, all of the techniques relating to determination of DOA information using transmitted and received cellular signals may also be applied to transmitted and received WiFi Signals.

Figure 21:
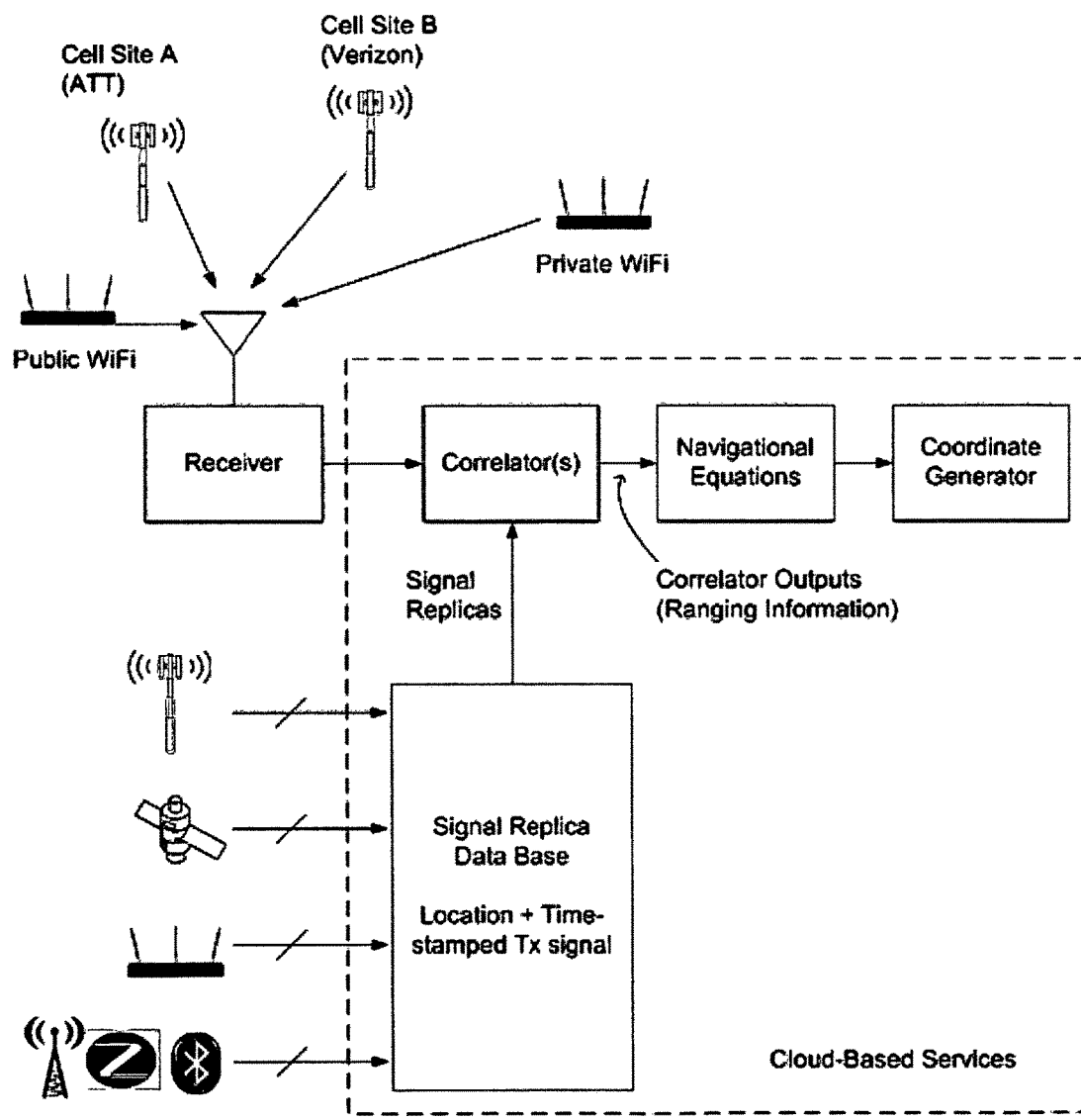
FIG. 21 illustrates a cloud-based system for determining the position of a client device.

A cloud-based system for determining the location of a client device through TDOA-based calculations is shown in FIG. 21. Various wireless sources such as cellular base stations, WiFi hotspots are employed. The signal replica for the various wireless sources are provided, as mentioned above, using a number of techniques, including but not limited to use of sniffer devices (not illustrated) and the resulting sniffer datagrams stored in the cloud. The client device (receiver) samples a subset of these wireless sources and uploads the resulting client datagram (or datagrams) to the cloud as well. One or more servers in the cloud (denoted by the dotted line) may then determine the position of the client device as described above.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A method, comprising:
   correlating a set of first samples taken by a first receiver of a terrestrial wireless transmission from a terrestrial wireless source with a set of second samples of a replica of the terrestrial wireless transmission to determine a correlation peak, wherein the set of second samples establishes a time of transmission for the terrestrial wireless transmission; and
   based upon a time difference between the correlation peak and the time of transmission from the terrestrial wireless source, determining a first pseudorange between the first receiver and the terrestrial wireless source.

2. The method of claim 1, wherein the terrestrial wireless source is selected from a group consisting of a cellular base station, a WiFi source, a Bluetooth source; and a wireless drone.

3. The method of claim 1, further comprising determining a plurality of additional pseudoranges between the first receiver and a plurality of corresponding additional terrestrial wireless sources.

4. The method of claim 3, further comprising determining a position for the first receiver based upon the first pseudorange and the plurality of additional pseudoranges.

5. The method of claim 1, further comprising determining a second pseudorange between the first receiver and a satellite.

6. The method of claim 5, further comprising determining a position for the first receiver using the first and second pseudoranges.

7. The method of claim 1, further comprising; uploading the set of first samples and the set of second samples to at least one cloud-based server, wherein correlating the set of first samples with the set of second samples and determining the first pseudorange is performed in the at least one cloud-based server.

8. The method of claim 1, wherein the set of second samples of the replica of the wireless transmission are formed at a second receiver.

9. The method of claim 1, wherein the set of second samples of the replica of the wireless transmission are provided by the terrestrial wireless source.

* * * * *